No. 766,825. PATENTED AUG. 9, 1904.
J. E. HAUSFELD.
MECHANICAL MOVEMENT.
APPLICATION FILED JULY 26, 1902.
NO MODEL. 2 SHEETS—SHEET 1.
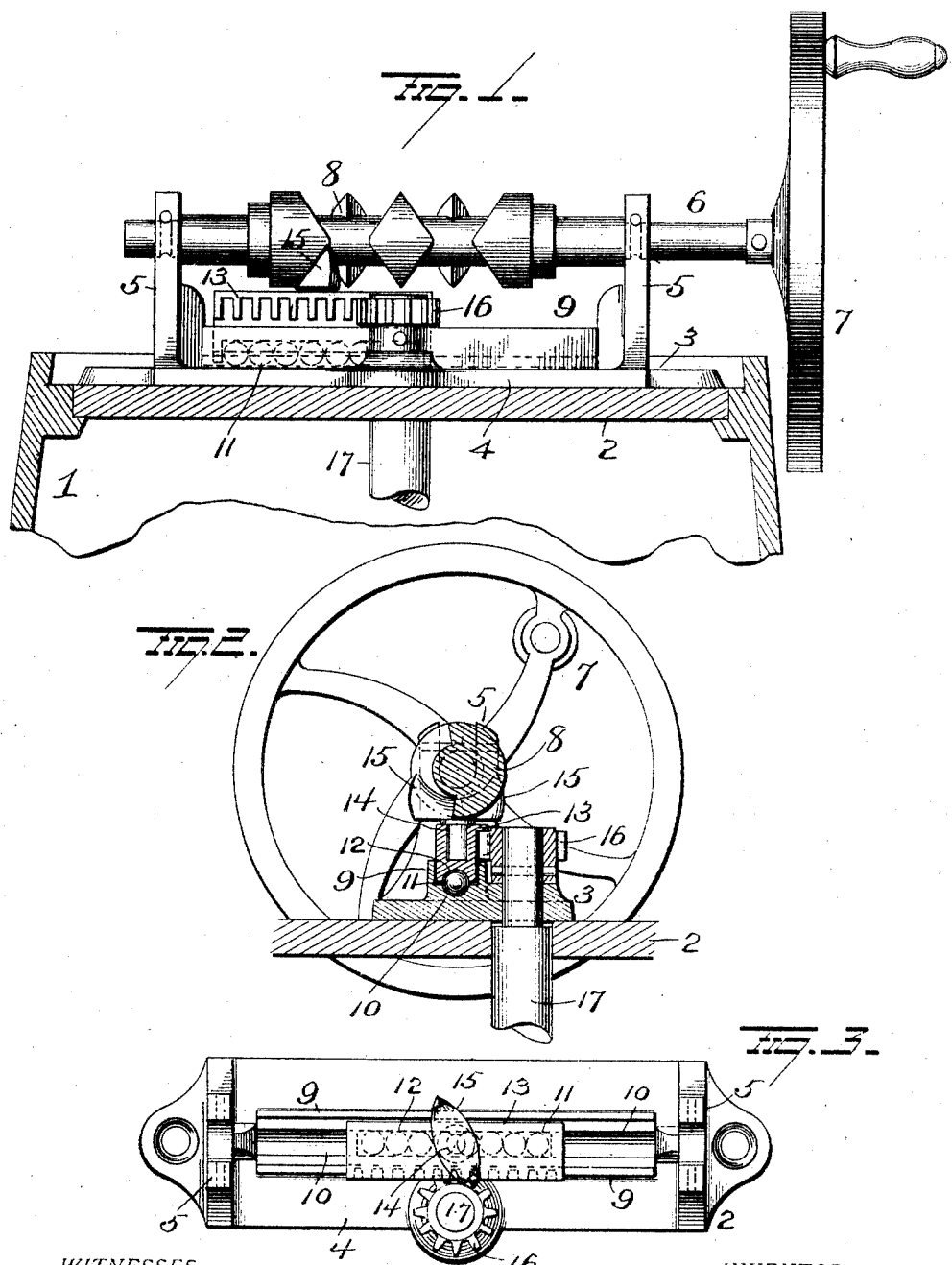

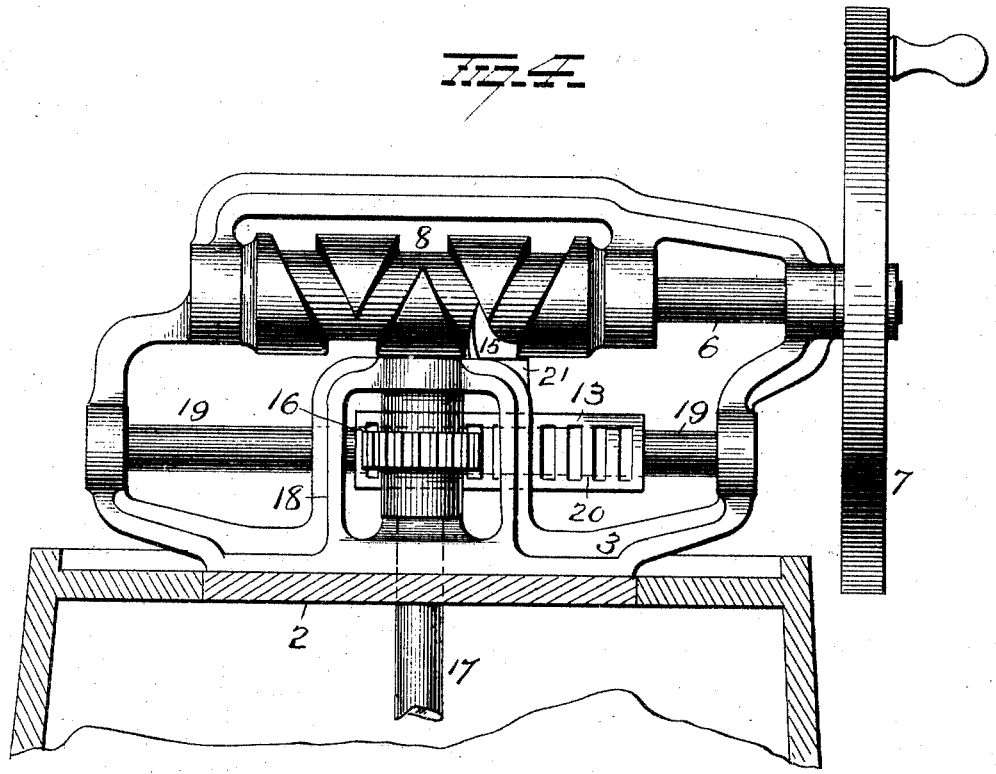
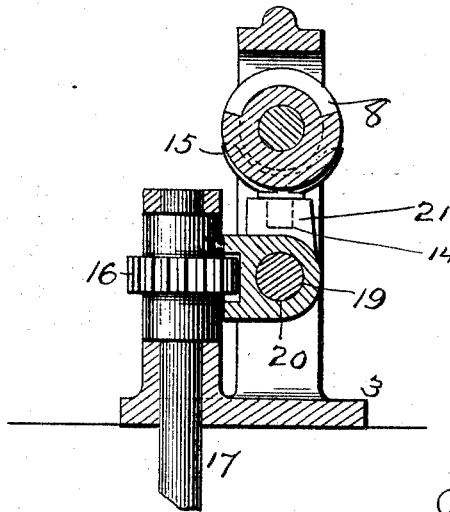

No. 766,825. Patented August 9, 1904.

UNITED STATES PATENT OFFICE.

JOSEPH E. HAUSFELD, OF CINCINNATI, OHIO, ASSIGNOR TO ERNST H. HUENEFELD, OF CINCINNATI, OHIO.

MECHANICAL MOVEMENT.

SPECIFICATION forming part of Letters Patent No. 766,825, dated August 9, 1904.

Application filed July 26, 1902. Serial No. 117,165. (No model.)

*To all whom it may concern:*

Be it known that I, JOSEPH E. HAUSFELD, of Cincinnati, in the county of Hamilton and State of Ohio, have invented certain new and useful Improvements in Mechanical Movements; and I do hereby declare the following to be a full, clear, and exact description of the invention, such as will enable others skilled in the art to which it appertains to make and use the same.

My invention relates to an improved mechanical movement, and more particularly to improved mechanism for alternately rotating a driven shaft in opposite directions by means of a drive-shaft continuously revolved in either direction, the object of the invention being to provide improvements of this character especially adapted for operating the alternating rotary dasher in washing-machines which will be practically noiseless, easy to operate, and perfect in operation.

With this object in view the invention consists in certain novel features of construction and combinations and arrangements of parts, as will be more fully hereinafter described, and pointed out in the claim.

In the accompanying drawings, Figure 1 is a view in elevation illustrating my improvements. Fig. 2 is a view in section. Fig. 3 is a plan view, partly broken away; and Figs. 4 and 5 are views of a modification.

1 represents a washing-machine having the ordinary cover 2, on which is secured a frame 3, supporting my improvements. This frame comprises a bed-plate 4, located on cover 2, and standards 5 at each end, having alined bearings for the horizontal drive-shaft 6, driven by a hand-wheel 7 or other suitable means.

On drive-shaft 6 a double cam-grooved or double worm-grooved cylinder 8 is secured. The double groove of the cylinder is of the proper length to give to the dasher just the proper throw, as will hereinafter appear.

On the bed-plate 4 of frame 3 and directly below drive-shaft 6 a grooved track or runway 9 is located and is provided with a central groove 10, in which run balls or rollers 11, partially inclosed in a recess 12 in the bottom of a rack 13, and this rack is provided centrally in its top with a pocket to receive a circular pin 14 on a dog 15 and permit oscillatory movement of the dog in the rack. This dog 15 is of a general canoe shape, sharp at each end and mounted in the double cam-groove of cylinder 8, so that when the cylinder is revolved in either direction the dog 15 will be moved to the end of one cam-groove and returned through the other cam-groove to the opposite end of the cylinder, the sharp ends of the dog preventing possibility of its becoming engaged by the ends of any of the cams forming the cam-grooves. This movement of dog 15 back and forth also moves the rack 13 from end to end of the track 9, and the rack is in mesh with a pinion 16, secured on the driven shaft or dasher-rod 17, supported on a bearing in bed-plate 4 of frame 3. Owing to the pivotal mounting of dog 15 in rack 13, the dog can turn to accommodate itself to the cam-groove and is of sufficient length to insure its being guided past the individual cams and not come in contact with the ends of any.

In operation drive-shaft 6 is turned by means of hand-wheel 7, and as the cylinder 8 revolves its cam or worm grooves will move dog 15 from end to end of the cylinder, thus moving rack 13 on its ball-bearings from end to end of track 9 and turn driven shaft or dasher-rod 17 alternately in reverse directions through the medium of pinion 16.

In Figs. 4 and 5 I have illustrated a slightly-modified form of my invention in which the supporting-frame 3 is made with a yoke 18, forming a bearing for the upper end of dasher-rod 17 and supports a rod 19 below and parallel with drive-shaft 6. The rack 13 is made with an elongated bearing 20 on this rod to reciprocate thereon and is provided with a standard 21, having a pocket therein to receive and pivotally support the depending pin 14 on dog 15. The operation of this form of my invention is precisely like the preferred form except that the rack 13 moves on rod 19 instead of in track 9 and the ball-bearings are dispensed with.

A great many other slight changes might be made in the general form and arrangement of the several parts described without departing from the spirit and scope of my invention, and hence I would have it understood that I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

The combination with a frame comprising a base-plate and uprights, of a driving-shaft mounted in said uprights, a double spiral-grooved cylinder rotatable with the driving-shaft, a driven shaft mounted in the frame and terminating at its upper end below the driving-shaft, a pinion secured to the upper end of said driven shaft, a longitudinally-movable rack supported by the frame intermediate of the driving and driven shafts and meshing with the latter, and a cam-faced dog swiveled upon said rack-bar and engaging the double spiral-grooved cylinder.

In testimony whereof I have signed this specification in the presence of two subscribing witnesses.

JOSEPH E. HAUSFELD.

Witnesses:
CHARLES E. PFAU,
M. C. LYKINS.